United States Patent [19]

Wang

[11] Patent Number: 5,054,330
[45] Date of Patent: Oct. 8, 1991

[54] MOTION TRANSFER MECHANISM WITH A LINKAGE

[75] Inventor: Sheng-Yau Wang, Tainan, Taiwan

[73] Assignee: Chun Zu Machinery Industry Co., Ltd., Kaohsiung Hsien, Taiwan

[21] Appl. No.: 540,380

[22] Filed: Jun. 19, 1990

[51] Int. Cl.$^5$ ............................................. F16H 28/08
[52] U.S. Cl. ........................................... 74/53; 74/40
[58] Field of Search ................................ 74/40, 53, 54

[56] References Cited

U.S. PATENT DOCUMENTS

| | | | |
|---|---|---|---|
| 1,270,569 | 6/1918 | Upham | 74/53 X |
| 1,964,665 | 6/1934 | Humphris | 74/40 |
| 2,467,677 | 4/1949 | L'Hermite | 74/40 X |
| 2,571,553 | 10/1951 | Esser et al. | 74/53 X |

*Primary Examiner*—Allan D. Herrmann
*Assistant Examiner*—David W. Laub
*Attorney, Agent, or Firm*—Leydig, Voit & Mayer

[57] ABSTRACT

A motion transfer mechanism for a machine includes a coupler interconnecting a one-arm crank member and the first crank arm of a two-arm crank member. A driving plate is mounted rotatably on the machine and has a cam edge. Any line, which connects any pair of points on the cam edge and also passes through the rotating axis of the driving plate, is at a predetermined distance. An input unit is connected to the driving plate so as to rotate the driving plate. A pair of roller followers are mounted pivotally on the coupler in association with the cam edge of the driving plate. The connecting line of the roller followers passes through the rotating axis of the driving plate. An output unit is connected to the second crank arm of the two-arm crank member. When the driving plate is rotated so that the roller followers slide along the cam edge of the driving plate, the one-arm and two-arm crank members are rotated so as to activate the output unit.

2 Claims, 4 Drawing Sheets

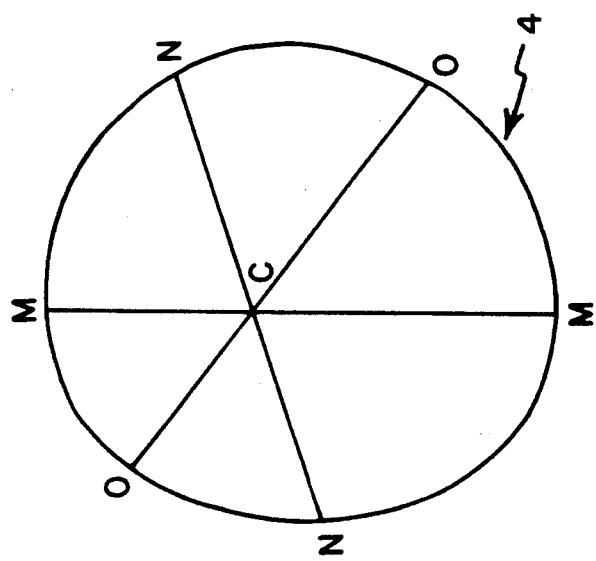
FIG. 4
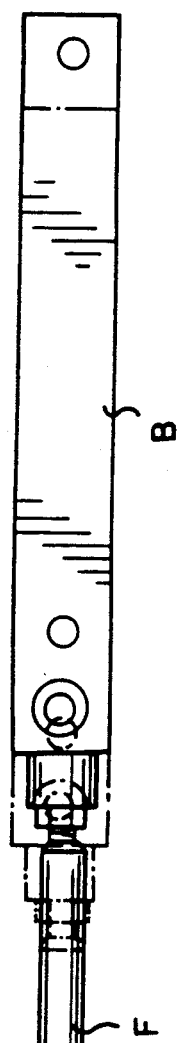
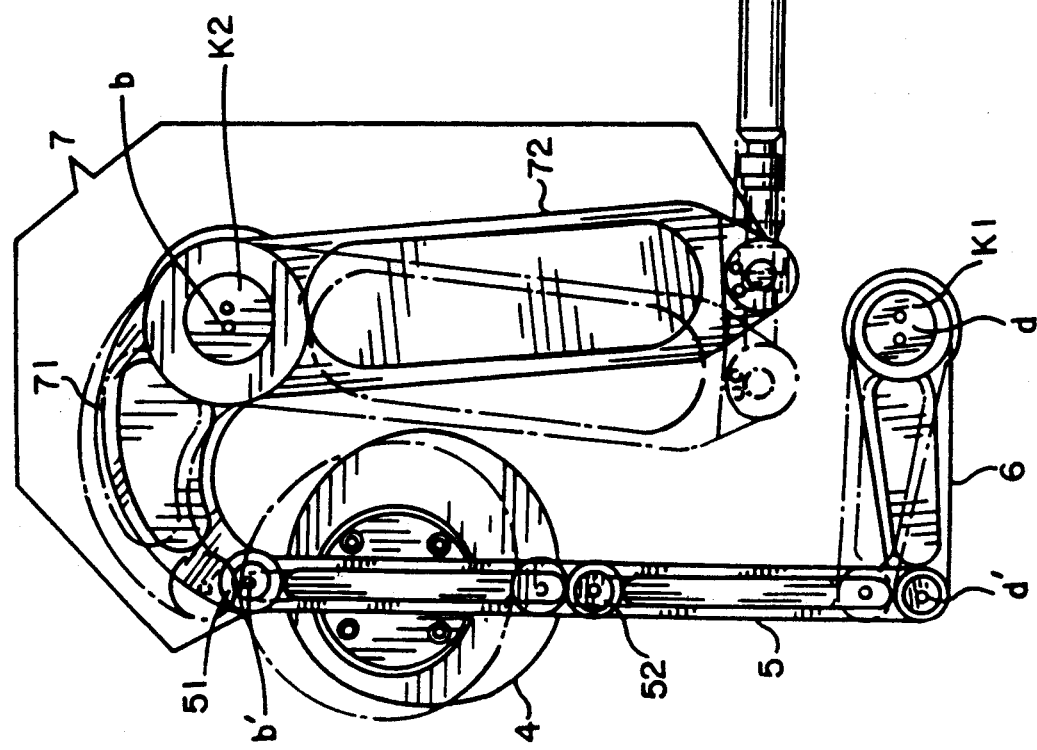
FIG. 5

MOTION TRANSFER MECHANISM WITH A LINKAGE

BACKGROUND OF THE INVENTION

This invention relates to a motion transfer mechanism, more particularly to a motion transfer mechanism with a linkage.

Normally, nut or bolt shaping machines are provided with pull plates which can move workpiece holders from one die to another. A motion transfer mechanism interconnects the device for driving the pull plates and a punch driving device so that the latter can drive the former. However, the complex structure of conventional motion transfer mechanisms obstructs the positive feed of the workpieces to be shaped in these forging machines.

SUMMARY OF THE INVENTION

It is therefore the main object of this invention to provide a motion transfer mechanism for a forging machine whereby the workpieces to be forged can be fed positively.

The feature of this invention is to provide a motion transfer mechanism with a linkage and cam assembly.

According to this invention, a motion transfer mechanism for a machine includes a coupler interconnecting a one-arm crank member and the first crank arm of a two-arm crank member. A driving plate is mounted rotatably on the machine and has a cam edge. Any pair of points of the cam edge, the connecting line of which passes through the rotating axis of the driving plate, are spaced apart at a predetermined distance. An input unit is connected to the driving plate so as to rotate the driving plate. A pair of roller followers are mounted pivotally on the coupler in association with the cam edge of the driving plate. The connecting line of the roller followers passes through the rotating axis of the driving plate. An output unit is connected to the second crank arm of the two-arm crank member. When the driving plate is rotated so that the roller followers slide along the cam edge of the driving plate, the one-arm and two-arm crank members are rotated so as to activate the output unit.

BRIEF DESCRIPTION OF THE DRAWING

Other features and advantages of this invention will become apparent in the following detailed description of a preferred embodiment of this invention, with reference to the accompanying drawings in which:

FIG. 4 illustrates the cam edge of the driving plate of the motion transfer mechanism according to this invention; and FIG. 5 the movement of the linkage of the motion transfer mechanism according to this invention.

DETAILED DESCRIPTION OF THE PREFERRED EMBODIMENT

Figure 1:
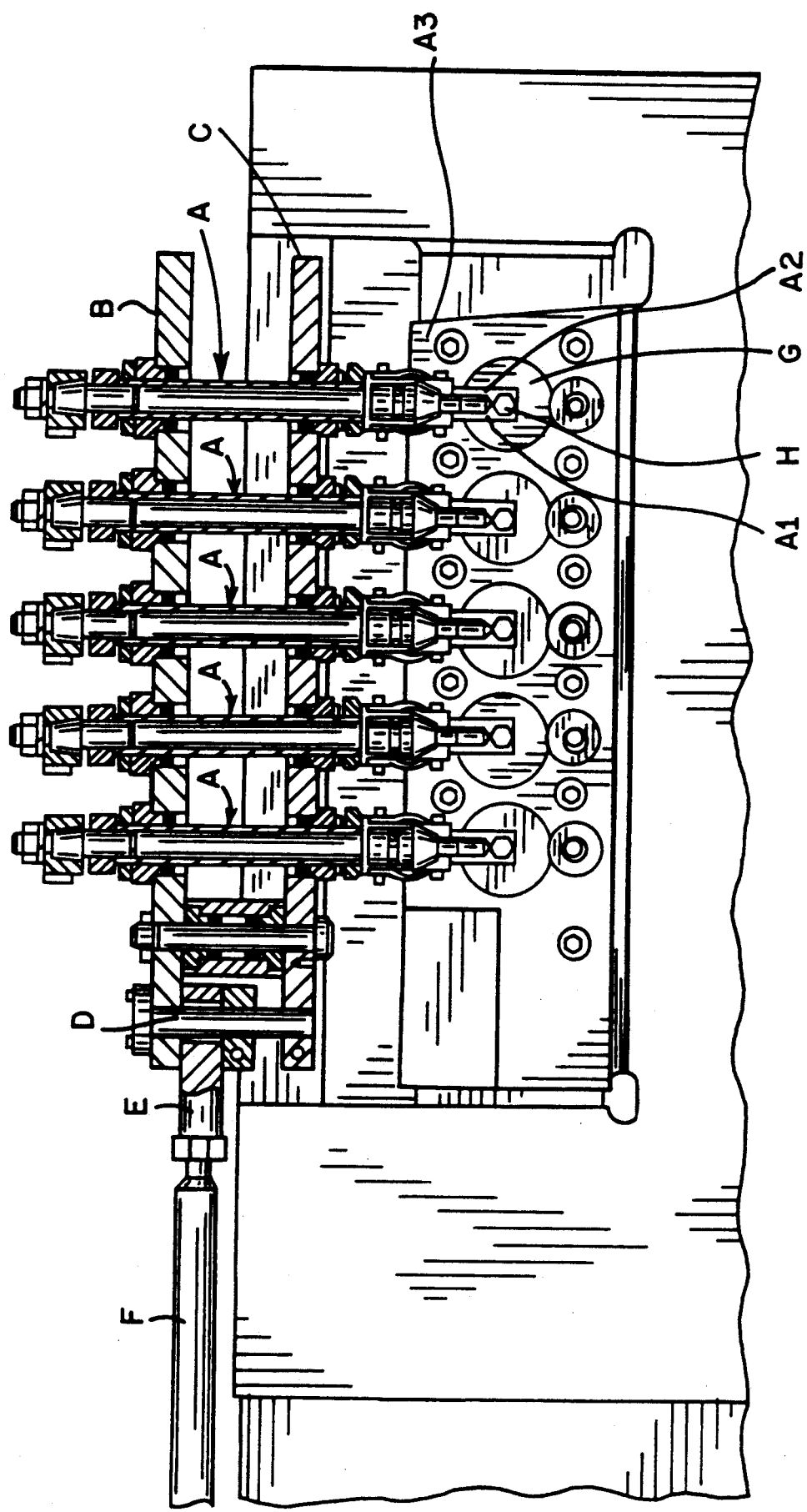
FIG. 1 illustrates the interconnection between the workpiece holders and the pull plates of a forging machine according to this invention.

Referring to FIG. 1, a forging machine of this invention includes a series of workpiece holders (A) each of which has a pair of jaws (A1, A2) constituting a chuck (A3). An upper pull plate (B) can move the upper portions of the workpiece holders (A). A lower pull plate (C) is connected to the upper pull plate (B) by a pivot pin (D) and can move the lower portions of the workpiece holders (A). A coupler (E) connects the pivot pin (D) to a pull rod (F). When the pull rod (F) or output unit moves the pull plates (B, C), the workpieces (H) are transmitted from one die (G) to another. The upper ends of the workpiece holders (A) ca be rotated by means of sector gears (A4), (see FIG. 2), so as to rotate the workpieces (H) held thereon to an angle of 180 degrees in a horizontal plane, thereby forging two ends of each of the workpieces (H).

Figure 2:
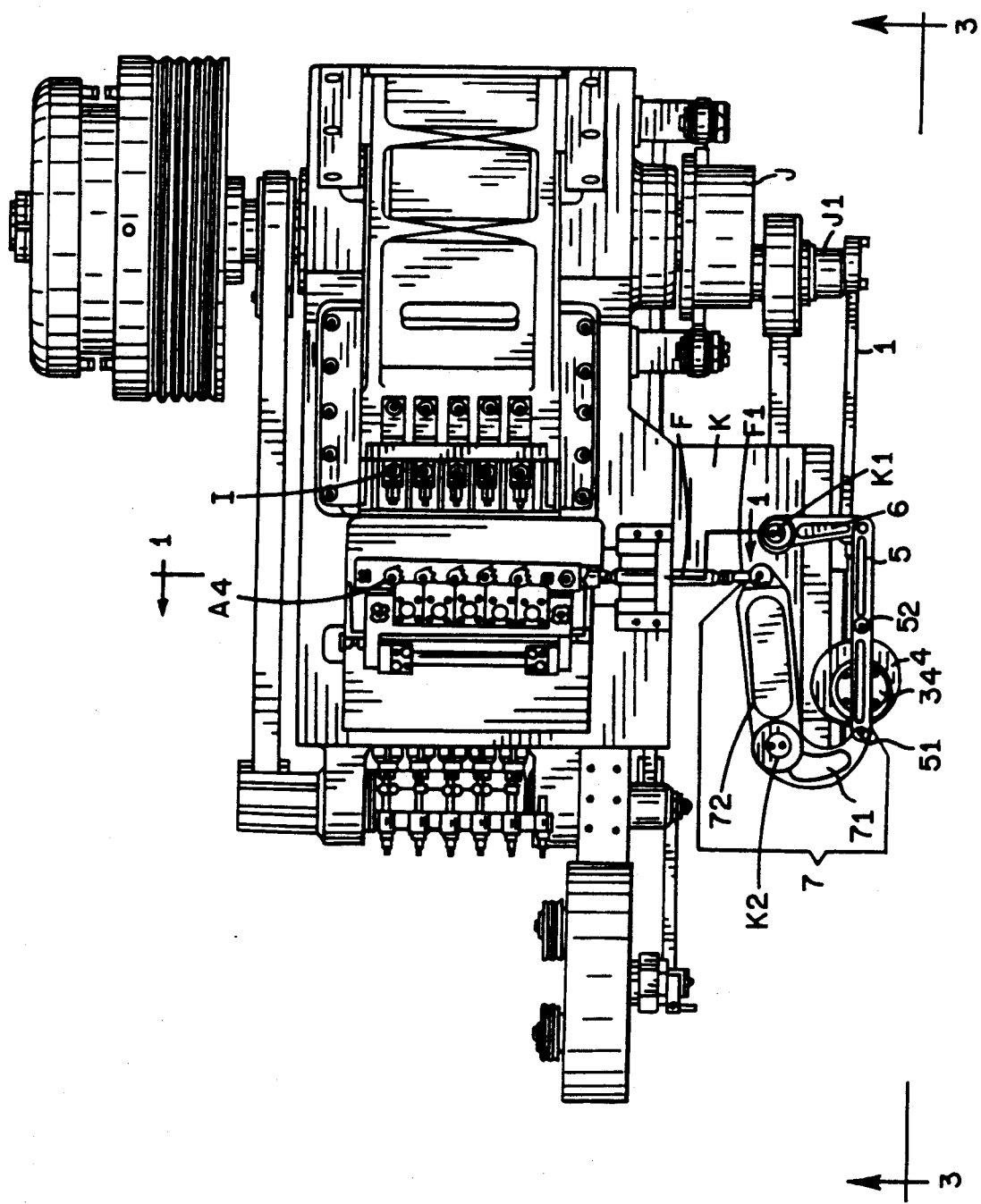
FIG. 2 a schematic top view illustrating the motion transfer mechanism of the forging machine according to this invention.
Figure 3:
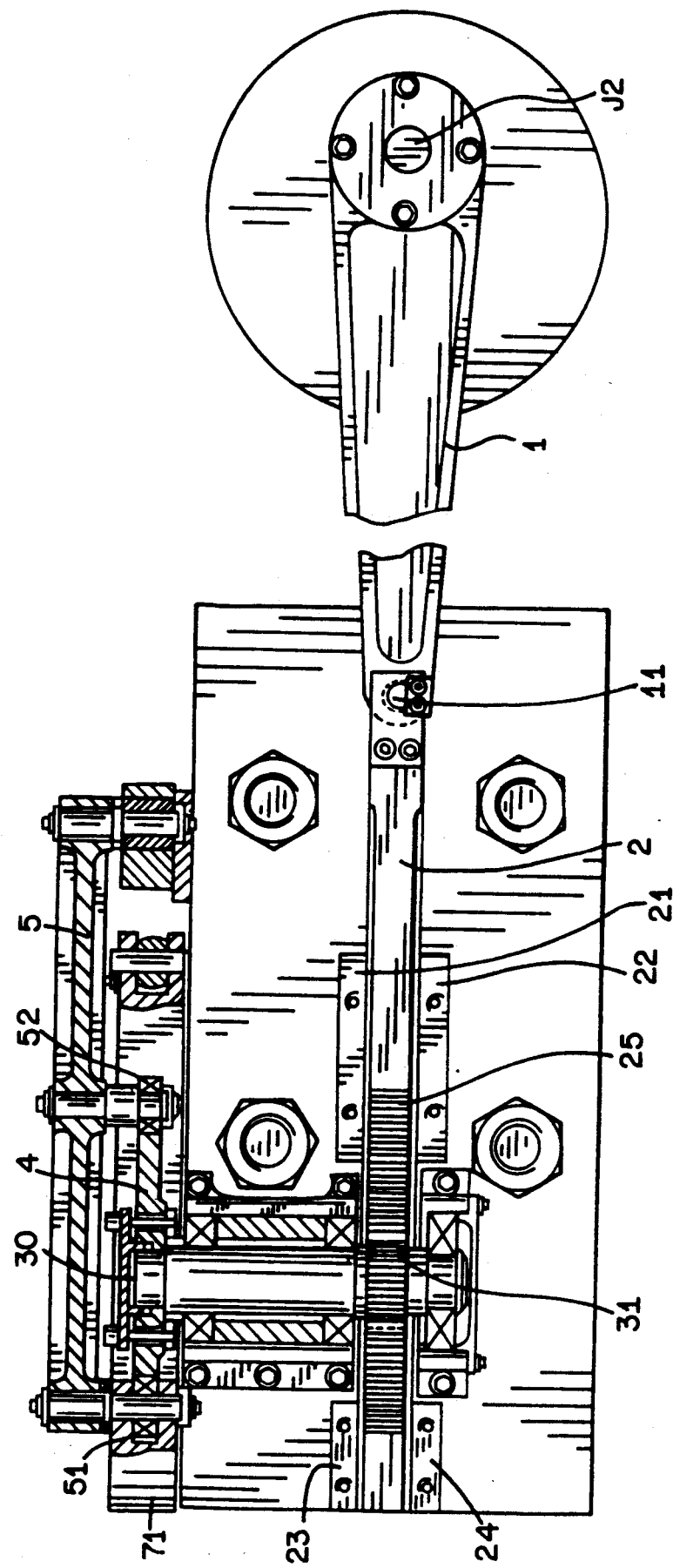
FIG. 3 is a schematic side view illustrating the motion transfer mechanism of the forging machine according to this invention.

FIGS. 2 and 3 are top and side views showing the motion transfer mechanism of this invention. As illustrated, a plurality of punches (I) are driven by means of a crank shaft (J). The input unit of the motion transfer mechanism includes a connecting rod 1 which is connected at one end thereof to a crank pin (J2) which is disposed on the crank arm (J1) of the crank shaft (J). The other end of the connecting rod 1 is connected rotatably to a slider 2 by a pivot 11. Four projecting plates 21, 22, 23, 24 define a slide slot in which the slider 2 is received. A rack 25 is fixed on the slider 2 and is engaged with a pinion 31 which is fixed on a rotating shaft 30. A driving plate 4 is sleeved rigidly on the rotating shaft 30 by a retainer 34 (see FIG. 2) and has a cam edge. A coupler 5 is connected rotatably to a one-arm crank member 6 at the right end thereof and to the first crank arm 71 of a two-arm crank member 7 at the left end and carries two roller followers 51, 52 which are engaged with the cam edge of the driving plate 4. The one-arm crank member 6 is mounted pivotally on the machine frame (K) by a pivot (K1), while the two-arm crank member 7 is mounted pivotally on the machine frame (K) by another pivot (K2). The first crank arm 71 of the two-arm crank member 7 is curved so as to prevent the driving plate 4 from collision herewith.

As shown in FIG. 4, any pair of points on the cam edge of the driving plate 4, the connecting line of which passes through the rotating axis C' of the driving plate 4, are spaced apart at a predetermined distance. For example, lines M-M, N-N and O-O have the same length. When the driving plate 4 rotates, the roller followers 51, 52 slide smoothly along the cam surface of the driving plate 4. The second crank arm 72 of the two-arm crank member 7 is connected pivotally to the pull rod (F) by a connector (F1).

When the crank shaft (J) is actuated, the driving plate 4 rotates. As shown in FIG. 5, the rotation of the driving plate 4 activates the linkage, which consists of the coupler 5, the one-arm crank member 6 and the two-arm crank member 7, so as to positively move the pull rod (F). In this embodiment, because the distance between points b and b' of the first crank arm 71 of the two-arm crank member 7 is equal to that between points d and d' of the one-arm crank member 6, when the driving plate 4 rotates to a certain angle, the one-arm crank member 6 and the two-arm crank member 7 rotate to the same angle.

Because of the incorporation of the linkage with the cam, smooth movement of the linkage and positive feed of the workpieces (H) can be obtained. It is understood that the cam edge of the driving plate 4 is designed according to the process of forging the workpieces (H).

With this invention thus explained, it is apparent that numerous modifications and variations can be made without departing from the scope and spirit of this invention. It is therefore intended that this invention be limited only as indicated in the appended claims.

I claim:

1. A motion transfer mechanism for a machine comprising:

a one-arm crank member mounted pivotally on the machine;

a two-arm crank member mounted pivotally on the machine and having a first crank arm and a second crank arm;

a coupler connected pivotally to the one-arm crank member at one end thereof and to the first crank arm of the two-arm crank member at the other end thereof;

a driving plate mounted rotatably on the machine and having a cam edge, wherein a line connecting any pair of points of the cam edge spaced by a predetermined distance also passes through a rotating axis of the driving plate;

an input unit connected to the driving plate so as to rotate the driving plate;

a pair of roller followers mounted pivotally on the coupler in association with the cam edge of the driving plate, connecting line of the roller followers passing through the rotating axis of the driving plate; and an output unit connected to the second crank arm of the two-arm crank member such that rotation of the driving plate causes the roller followers to slide along the cam edge of the driving plate, and the one-arm and two-arm crank members to be rotated so as to activate the output unit.

2. A motion transfer mechanism as claimed in claim 1, wherein the output unit includes a crank shaft journalled on the machine, a slide slot formed in the machine, a slider received slidably in the slide slot and including a fixed rack, a connecting rod having a first end connected pivotally to one end of the crank shaft and a second end of the connecting rod pivotally connected to the slider, a rotating shaft connected securely to the driving plate and including a fixed pinion engaged with the rack of the slider, wherein actuation of the crank shaft rotates the driving plate.

* * * * *